United States Patent
Al Rawi et al.

(10) Patent No.: US 10,193,594 B2
(45) Date of Patent: Jan. 29, 2019

(54) METHOD AND APPARATUS FOR TRANSMITTING AND RECEIVING SIGNALS OVER PAIRS OF WIRES

(71) Applicant: British Telecommunications Public Limited Company, London (GB)

(72) Inventors: Anas Al Rawi, London (GB); Leslie Humphrey, London (GB); Trevor Linney, London (GB); Ian Horsley, London (GB)

(73) Assignee: British Telecommunications Public Limited Company, London (GB)

( * ) Notice: Subject to any disclaimer, the term of this patent is extended or adjusted under 35 U.S.C. 154(b) by 3 days.

(21) Appl. No.: 15/515,403

(22) PCT Filed: Sep. 29, 2015

(86) PCT No.: PCT/EP2015/072407
§ 371 (c)(1),
(2) Date: Mar. 29, 2017

(87) PCT Pub. No.: WO2016/050765
PCT Pub. Date: Apr. 7, 2016

(65) Prior Publication Data
US 2017/0244446 A1    Aug. 24, 2017

(30) Foreign Application Priority Data
Sep. 30, 2014    (EP) .................................... 14250116

(51) Int. Cl.
*H04B 3/32* (2006.01)
*H04M 11/06* (2006.01)
(Continued)

(52) U.S. Cl.
CPC ............. *H04B 3/32* (2013.01); *H04L 5/0007* (2013.01); *H04L 5/0048* (2013.01);
(Continued)

(58) Field of Classification Search
None
See application file for complete search history.

(56) References Cited

U.S. PATENT DOCUMENTS

2004/0186865 A1* 9/2004 Schenk ............... H04L 27/2614
708/200
2005/0002441 A1  1/2005 Rovini et al.
(Continued)

FOREIGN PATENT DOCUMENTS

WO    WO 2008/005507 A2    1/2008
WO    WO 2013/026479 A1    2/2013

OTHER PUBLICATIONS

International Search Report for corresponding International Application No. PCT/EP2015/072407 dated Dec. 18, 2015; 4 pages.
(Continued)

*Primary Examiner* — Otis L Thompson, Jr.
(74) *Attorney, Agent, or Firm* — Amy M. Salmela; Patterson Thuente Pedersen, P.A.

(57) ABSTRACT

A method of transmitting data from a transmitter device to a plurality of receiver devices each of which is connected to the transmitter device via a respective wire connection the method comprising transmitting a common signal onto all or both of the respective wire connections and using a multiple access technique to enable respective virtual data channels to be generated for transmitting data from the transmitter device to each of the receiver devices via its own respective virtual data channel.

9 Claims, 6 Drawing Sheets

(51) Int. Cl.
  *H04L 27/26* (2006.01)
  *H04L 5/00* (2006.01)
  *H04J 13/00* (2011.01)
(52) U.S. Cl.
  CPC ....... *H04L 27/2602* (2013.01); *H04M 11/062* (2013.01); *H04J 2013/0081* (2013.01)

(56) References Cited

U.S. PATENT DOCUMENTS

| | | | | |
|---|---|---|---|---|
| 2009/0270038 | A1* | 10/2009 | Clausen | H04B 3/32 455/63.1 |
| 2010/0054314 | A1* | 3/2010 | Korobkov | H04L 1/0007 375/222 |
| 2011/0150057 | A1* | 6/2011 | Anschutz | H04B 3/32 375/222 |
| 2011/0222611 | A1* | 9/2011 | Lindqvist | H04B 3/32 375/257 |
| 2012/0020418 | A1* | 1/2012 | Sands | H04B 3/32 375/259 |
| 2012/0224683 | A1* | 9/2012 | Goodson | H04B 3/32 379/406.06 |
| 2013/0229905 | A1* | 9/2013 | Schenk | H04B 3/32 370/201 |
| 2014/0023127 | A1* | 1/2014 | Pereira | H04B 3/32 375/224 |
| 2015/0163350 | A1* | 6/2015 | Shi | H04M 11/062 379/1.03 |
| 2015/0318875 | A1* | 11/2015 | Kuipers | H04B 1/0057 370/297 |
| 2017/0026521 | A1* | 1/2017 | Horsley | H04B 3/32 |
| 2017/0085719 | A1 | 3/2017 | Linney et al. | |
| 2017/0244446 | A1 | 8/2017 | Al Rawi et al. | |
| 2017/0279634 | A1 | 9/2017 | Horsley et al. | |
| 2018/0083815 | A1* | 3/2018 | Humphrey | H04L 27/265 |

OTHER PUBLICATIONS

Written Opinion of the International Searching Authority for corresponding International Application No. PCT/EP2015/072407 dated Dec. 18, 2015; 5 pages.

Karp et al., "Zero-forcing frequency-domain equalization for generalized DMT transceivers with insufficient guard interval," EURASIP Journal on Applied Signal Processing (2004) 10: 1446-1459.

Tang et al., "Multiple users adaptive modulation schemes for MC-CDMA," Global Telecommunications Conference, 2004. Globecom '04. IEEE Dallas, TX, Nov. 29-Dec. 3, 2004; 3823-3827. XP010758452.

Application and Filing Receipt for U.S. Appl. No. 15/312,264, filed Nov. 18, 2016, Inventors: Linney et al.

Application and Filing Receipt for U.S. Appl. No. 15/504,795, filed Feb. 17, 2017, Inventors: Horsley et al.

* cited by examiner

METHOD AND APPARATUS FOR TRANSMITTING AND RECEIVING SIGNALS OVER PAIRS OF WIRES

CROSS-REFERENCE TO RELATED APPLICATIONS

The present application is a National Phase entry of PCT Application No. PCT/EP2015/072407, filed on 29 Sep. 2015, which claims priority to EP Patent Application No. 14250116.2, filed on 30 Sep. 2014, which are hereby fully incorporated herein by reference.

TECHNICAL FIELD

The present disclosure relates to a method and apparatus for transmitting and receiving signals over pairs of wires. Such methods include all of the various Digital Subscriber Line (DSL) methods as specified in various International Telecommunications Union (ITU) standards and as being further developed in the ITU at present. Typically each such pair of wires comprises a twisted metallic pair (usually copper) as commonly found within telephone access networks throughout the world.

BACKGROUND

DSL technology takes advantage of the fact that although a legacy twisted metallic pair (which was originally installed to provide merely a Plain Old Telephone Services (POTS) telephony connection) might only have been intended to carry signals at frequencies of up to a few Kilohertz, in fact such a line can often reliably carry signals at much greater frequencies. Moreover, the shorter the line, the greater is the range of frequencies over which signals can be reliably transmitted (especially with the use of technologies such as Discrete Multi-Tone (DMT), etc.). Thus as access networks have evolved, telecommunications network providers have expanded their fiber optic infrastructure outwards towards the edges of the access network, making the lengths of the final portion of each connection to an end user subscriber (which is still typically provided by a metallic twisted pair) shorter and shorter giving, rise to correspondingly greater and greater bandwidth potential over the increasingly short twisted metallic pair connections—without having to bear the expense of installing new optic fiber connections to each subscriber.

However, a problem with using high frequency signals is that a phenomenon known as crosstalk can cause significant interference reducing the effectiveness of lines to carry high bandwidth signals in situations where there is more than one metallic pair carrying similar high frequency signals in close proximity to one another. In simple terms, the signals from one wire can "leak" onto a nearby line carrying similar signals and appear as noise to the other line. Although cross talk is a known problem even at relatively low frequencies, the magnitude of this effect tends to increase with frequency to the extent that at frequencies in excess of a few tens of Megahertz (depending on the length of the lines in question), the indirect coupling (e.g. from a near end of a second line to a remote end of a first line) can be as great as the direct coupling (e.g. from the near end of the first line to the remote end of the first line).

In order to alleviate the problems caused by cross talk (especially Far End Cross Talk, or "FEXT" as it is known) a technology known as vectoring has been developed in which knowledge of the signals sent over crosstalking lines is used to reduce the effects of the crosstalk. In a typical situation a single DSLAM acts as a co-generator of multiple downstream signals over multiple cross-talking lines and also as a co-receiver of multiple upstream signals from the same multiple cross-talking lines, with each of the lines terminating at a single Customer Premises Equipment (CPE) modem such that no common processing is possible at the CPE ends of the lines. In such a case, downstream signals are pre-distorted to compensate for the expected effects of the cross-talking signals being sent over the neighboring cross-talking lines such that at reception at the CPE devices the received signals are similar to what would have been received had no cross-talking signals been transmitted on the cross-talking lines. Upstream signals on the other hand are post-distorted (or detected in a manner equivalent to their having been post-distorted) after being received at the co-receiver (the DSLAM) in order to account for the effects of the cross-talk which has leaked into the signals during their transmission.

Such vectoring techniques can deal very successfully with situations where the indirect coupling is significantly weaker than the direct coupling. However as the relative strengths of the direct and indirect coupling approach each other, vectoring is less able to function effectively.

WO 2008/005507 describes a system for performing Adaptive Multi-Carrier Code Division Multiple Access (Adaptive MC-CDMA—or AMC-CDMA) which is particularly suited to use in powerline transmission systems where data is transmitted over wires intended for carrying electrical power. Such a system may have many devices connected to one another over a common transmission medium (the power line) for which there is no possibility of sending signals from one transceiver to another over a dedicated respective pair of wires as is the case with a conventional telephone access network. Such a transmission medium suffers from continuously changing conditions. The system AMC-CDMA is therefore adaptive to permit rapid changes in bit loading using the MC-CDMA modulation approach.

US 2005/002441 describes a Multi-Carrier Code Division Multiple Access transmission technique for use in transmitting data over a VDSL link comprising a single twisted copper pair connection between two co-operating VDSL modems. The drawback of using CDMA which is that multiple chips are required for each bit of data to be transmitted is mitigated against by simultaneously sending multiple chips associated with different data bits. For this reason the inventors refer to their scheme as Multi Code Multi-Carrier Code Division Multiple Access (or MC MC-CDMA). Signals being transmitted over other neighboring lines cause FEXT which is treated as noise because it is unrelated to the signal being transmitted over the line connecting the cooperating MC MC-CDMA modems.

"Multiple users adaptive modulation schemes for MC-CDMA" by Tang C et al. (published on 29 Nov. 2004 in the Global Telecommunications Conference, 2004, GLOBECOM '04, IEEE DALLAS, Tex., USA 29 Nov.-3 Dec. 2004, Picataway, N.J., USA pages 3823-3827) XP010758452, ISBN: 978-0-7803-8794-2) describes the use of MC-CDMA under a frequency-selective fading channel (i.e. over the air interface) for wireless systems. The paper investigates this topic and proposes a configuration that not only permits multiple users to employ adaptive modulation, but also leads to an equivalent sub-carrier concept that enables a group of sub-carriers to be represented by an equivalent sub-carrier of a conventional OFDM modem, thereby allowing various powerful bit/power loading schemes originally developed for OFDM to be directly deployed to MC-CDMA.

WO2013026479 applied for by Ericsson proposes a method of transmitting signals, in such a situation (i.e. where an indirect coupling is comparable to a direct coupling for a given line), which involves transmitting signals intended for reception by a single CPE device (a first CPE device) onto both the line directly coupled to the first CPE device and onto a crosstalking line coupled only indirectly to the first CPE device (it being directly coupled to a second CPE device). A Time Division Multiplexing (TDM) method is used to enable data to be sent (in different time slots) to the two respective CPE devices (with data being sent over both wires at the same time to only one of the CPE devices at a time). In order to ensure that the two signals constructively interfere at the receiving CPE device, the same signal as sent over one line is pre-distorted (e.g. to introduce a delay and/or phase change) before being sent over the other to account for changes in the direct vs. the indirect coupled paths.

SUMMARY

According to a first aspect of the present disclosure, there is provided a method of transmitting data from a transmitter device to a plurality of receiver devices, each of which is connected to the transmitter device via a respective twisted metallic pair of wires, the method comprising transmitting a common signal onto all or both of the respective pairs of wires and using a multiple access technique to enable respective virtual data channels to be generated for transmitting data from the transmitter device to each of the receiver devices via its own respective virtual data channel.

In this way, the set of twisted metallic pairs becomes a "common" shared channel over which a number of virtual channel are overlaid (i.e. the virtual channels are overlaid over the underlying common shared channel). It is interesting to observe, however, that this "common" shared channel is comprised of several different sub-channels which combine together at each receiver device (for example a single direct path channel over a twisted metallic pair directly connecting the transmitter to the respective receiver, and one or more indirect, cross-talk paths from the transmitter to the receiver via at least one twisted metallic pair which is connected between the transmitter and another of the receivers). For this reason, the "common" shared channel is henceforth termed a composite channel comprising a composition of direct and indirect path sub-channels.

This aspect of the disclosure is distinguished over prior art techniques relating to the use of MC-CDMA techniques in environments in which the physical circumstances of the channel used for transmitting data is inherently a shared physical channel (i.e. with no spatial diversity) such as WO 2008/005507 which relates to powerline systems in which the channel is formed from a user's home power cable wiring, US 2005/002441 which relates to a single twisted copper wire pair connection between two modems, and the above-mentioned MC-CDMA paper by Tang C et al in which the channel is an over-air, wireless channel, by virtue of its use in an environment in which a single transmitter device is connected to multiple receiver devices, each via its own respective twisted metallic pair connection/channel. The present inventors have realized that because of the effects of crosstalk especially at higher frequencies, the cost of attempting to maintain independence of the channels to continue to exploit them as independent isolated channels becomes excessively costly (in terms of power and hence bandwidth expended on countering crosstalk effects—e.g. by vectoring) at higher frequencies and hence a better solution is to treat the separate channels as a single composite channel. At this point one must then consider how best to exploit the single common composite channel formed from plural spatially diverse twisted copper pair connections each connecting to a respective receiver and the solution of the first aspect of the disclosure is to transmit a common signal onto all of the plural twisted metallic pair connections and to use a multiple access technique such as MC-CDMA in order to enable different data to be transmitted to the different receivers.

The composite channel will (generally) be different at each of the receivers, because the individual sub-channels from the transmitter to each respective receiver will (generally) be different at each receiver and, additionally, the way in which the sub-channels combine (with some sub-channels tending to constructively interfere with one another and others tending to destructively interfere with one another) will also differ from receiver to receiver. Moreover, the composite channel for each receiver will additionally vary over frequency and the variation by frequency will also (generally) be different from one receiver to another. In this way, the composite channel may be "good" for one receiver at one frequency and "bad" for another receiver at that same frequency. The quality of the composite channel may also vary over time, however, such variation over time tends to be less significant for channels formed over paths formed from twisted metallic pairs than for channels formed over wireless channels and so for the purposes of the present disclosure, such variations over time are largely ignored. In some embodiments new measurements of the composite channel are taken from time to time and the multiple access configuration is reconfigured only if the (new) measurements indicate that a significant improvement would result from such a reconfiguration because the composite channel has varied sufficiently significantly since the last reconfiguration was performed.

In some embodiments the common signal is a discrete multi-tone signal in which the modulation level per tone may be varied. Moreover it can be advantageous if different levels of modulation are used for data, destined for different receiver devices, transmitted within the common signal within a given tone in dependence upon differences in the received signal to noise ratio of signals received at the different receiver devices for the given tone. For example, if a first receiver determines that a DMT signal should be capable of being successfully detected with sufficient accuracy to permit x bits of data to be reliably received in a particular tone, whilst a second receiver determines that the same DMT signal should be capable of being successfully detected with sufficient accuracy to permit y bits of data (per frame) to be reliably received in that tone, where y is not equal to x, then it can be advantageous if the transmitter is able to combine the data in such a way that the amount of data transmitted to the first receiver depends upon x whereas the amount of data transmitted to the second receiver depends upon y by using a modulation technique which modulates the data for the first receiver with a modulation level dependent upon x and modulates the data to be transmitted to the second receiver using a modulation technique which modulates the data to be transmitted to the second receiver with a modulation level which depends upon y. For example, the modulation may involve selecting a constellation point from within a modulation constellation and the modulation level may correspond to the number of distinct constellation points within the modulation constellation (or more particularly to the logarithm base 2 thereof). Using a TDMA approach this simply requires selecting from a different modulation constellation depending upon the time slot, similarly for FDMA where different tones are allocated to different receivers, it requires selecting from the modulation constellation appropriate for the receiver to which the tone has been allocated. Where a CDMA approach is used the data for the different receivers is modulated using the appropriate modulation constellation for each receiver and for each tone and then the modulation values are combined into multiple chips for transmission over the respective tone using different spreading codes for the different receivers.

Because the quality of the composite channel varies by frequency differently for different receivers, although, as a general matter, any kind of multiple access technique could be used (for example a Time Division Multiple Access (TDMA) technique could be employed in which the time at which the common signal is transmitted and/or received is used to associate the signal with one of a plurality of pre-determined timeslots—which may repeat regularly with a periodicity associated with a "frame" comprising a number of timeslots—and the data carried within the signal during a particular time slot can be associated with a particular receiver according to a predetermined allocation of timeslots to receivers) using Frequency Division Multiple Access (FDMA) is advantageous in some cases. The reason for the advantageousness of FDMA (over say TDMA) is that the variation in quality of the composite channel with both frequency and by receiver can be exploited.

For example, if, in a simple example chosen for illustrative purposes, a system comprises a single transmitter (e.g. an Access Node (AN) such as a Digital Subscriber Line Access Multiplexor (DSLAM)) and two receivers, A and B, (e.g. DSL or G.FAST modems), each receiver being connected to the transmitter by a single twisted metallic pair connection, and wherein the transmitter transmits a common signal onto both twisted metallic pairs using an Orthogonal Frequency Division Modulation (OFDM) or Discrete MultiTone (DMT) modulation scheme, if A determines that, based on channel measurements, a particular tone X can support 4 bits per symbol whereas a second tone Y can only support 2 bits per symbol, whilst B determines that tone X can only support 2 bits per symbol whilst tone Y can support 4 bits per symbol, then data transmitted over tone X could be designated as exclusively for receiver A whilst data transmitted over tone Y could be designated as exclusively for receiver B. In this way both A and B would be receiving data at 4 bits per symbol in respect of tones X and Y combined whereas if TDMA were used, the best that could be achieved with a 50% duty rate (i.e. one symbol for receiver A followed by one symbol for receiver B, etc.) would be 6/2=3 bits per symbol for tones X and Y combined (assuming that the complexity of changing modulation from one symbol to another can be handled by the AN) for each receiver.

A CDMA technique can also be useful, especially where the quality of the channel is varying at different tones over time. In such an environment, one must generally be quite conservative in terms of say how many bits a system attempts to transmit per symbol and per tone. Using MultiCarrier CDMA (MC_CDMA), the signal can effectively be spread over a number of different tones and if the quality of one tone deteriorates but is compensated for by an improvement in the quality of another tone, then provided the average overall quality remains constant, the communication should not suffer. Embodiments described below explain in greater detail how MC-CDMA can be used.

For the above reasons, although any multiple access technique may be employed, it can be advantageous to use either a Frequency Divisional Multiple Access (FDMA) technique or a Code Division Multiple Access (CDMA) technique.

When using an FDMA technique it is advantageous for an intelligent tone allocation technique to be employed which allocates tones to receivers in a manner which attempts to maximize both the total data rate and the data rate of the receiver achieving the worst data rate. An example of one such intelligent tone allocation technique is described in greater detail below with reference to a specific embodiment.

Note that in embodiments of the present disclosure, the method of the first aspect of the present disclosure (hereinafter referred to as "the combined direct and indirect channels mode" or "the combined channels mode" or "CCM") is only employed in a predetermined (e.g. upper) portion or portions of the available frequency spectrum available for use in communicating over the metallic pair connections. In embodiments this is done by assigning certain tones to operate in a CCM mode whilst other tones are operated in another mode of operation such as vectored DMT. In embodiments CCM is employed only in a predetermined upper portion of the frequency spectrum above a cut-off frequency hereinafter referred to as a "CCM cut-off frequency" and in a lower portion of the available frequency spectrum an alternative mode such as vectored DMT is used, below the cut-off frequency. Also note that in some embodiments CCM is only used for transmitting data in the "downstream" direction (i.e. from the single transmitter to the multiple receivers); in such embodiments, upstream signals are sent only in frequencies below the CCM cut-off frequency. In embodiments, a dynamic and flexible technique is employed for determining the CCM cut-off frequency to use. It is reasonable to assume that (in general) vectoring techniques will work well up to a range of frequencies at which cross-talk coupling starts to become as about as large as direct coupling, but thereafter for ever greater frequencies becomes less and less efficient (in terms of spectral efficiency for a given transmit power level). The spectral efficiency of a Combined Channels Mode (CCM) arrangement however does not reduce so quickly with higher frequencies. In embodiments the technique involves making measurements of the channel quality at different frequencies and with training signals being sent over different twisted metallic pairs so that an assessment of various cross-talk couplings can be assessed, and wherein the selection of a CCM cut-off frequency is made based on those measurements in a manner which seeks to maximize the overall spectral efficiency of the system using vectored DSL below the CCM cut-off frequency and CCM above the CCM cut-off frequency. In some embodiments this can be done by selecting, as a CCM cut-off frequency or cut-off tone, a frequency (or tone) at which all tones having a frequency above the cut-off frequency (or above the frequency of the cut-off tone) are estimated to be able to carry less than a predetermined number of bits when operating in a vectored DMT mode (or a frequency above which more than a predetermined proportion of the tones are estimated to be able to carry less than a predetermined number of tones, or a frequency above which the mean (or other average) number of estimated bits per tone falls below a certain predetermined number, etc.).

Further aspects of the present disclosure relate to apparatus for carrying out the method in particular in the form of modems such as end-user modems and Access Nodes (ANs) (such as Digital Subscriber Line Access Multiplexors (DSLAMs)) especially such modems which are operable to communicate in accordance within a G.FAST protocol and are deployable across a short twisted metallic pair (or group of pairs) extending between a drop point and a user's premises such that the twisted metallic pair(s) has (have) a length of less than 500 meters and most preferably about 250 meters or less. An additional aspect relates to processor implementable instructions for causing a modem or modems to perform the method of the first aspect of the disclosure; similarly, further aspects relate to a carrier medium (especially a non-transient carrier medium such as an optical or magnetic storage device (such as a floppy disk, a hard drive, a CD or a DVD) or a solid state memory device such as an SSD drive or a USB thumb-drive, etc.).

Thus, a second aspect of the present disclosure relates to a transmitter for transmitting data, to at least a first and a second receiver device via respective first and second wire connections which directly connect each respective receiver device to the transmitter device, using a discrete multi-tone communication method employed at frequencies at which there is significant indirect coupling between the wire connections, the transmitter device comprising a data combiner for combining a first set of data to be transmitted to the first receiver and a second set of data to be transmitted to the second receiver into a single common discrete multi-tone signal and a line driver for driving both the first and second wire connections with the common signal.

A third aspect relates to a receiver device for receiving data transmitted to it over a wire connection from a transmitter according to the second aspect, the receiver comprising a receiver for receiving the common discrete multi-tone signal, and a data extractor for extracting from the common signal a first set of data transmitted by the transmitter for reception at the receiver device. In some embodiments, the data extractor comprises a de-spreader module for performing a de-spreading operation on the received signal in accordance with a code division multiple access technique. In alternative embodiments, the data extractor comprises a tone selector for selecting a sub-set of values detected by the receiver and associated with different tones based on a predetermined allocation of tones to the receiver as specified by the transmitter.

BRIEF DESCRIPTION OF THE FIGURES

In order that the present disclosure may be better understood, embodiments thereof will now be described, by way of example only, with reference to the accompanying figures in which.

DESCRIPTION OF EMBODIMENTS

Figure 1:
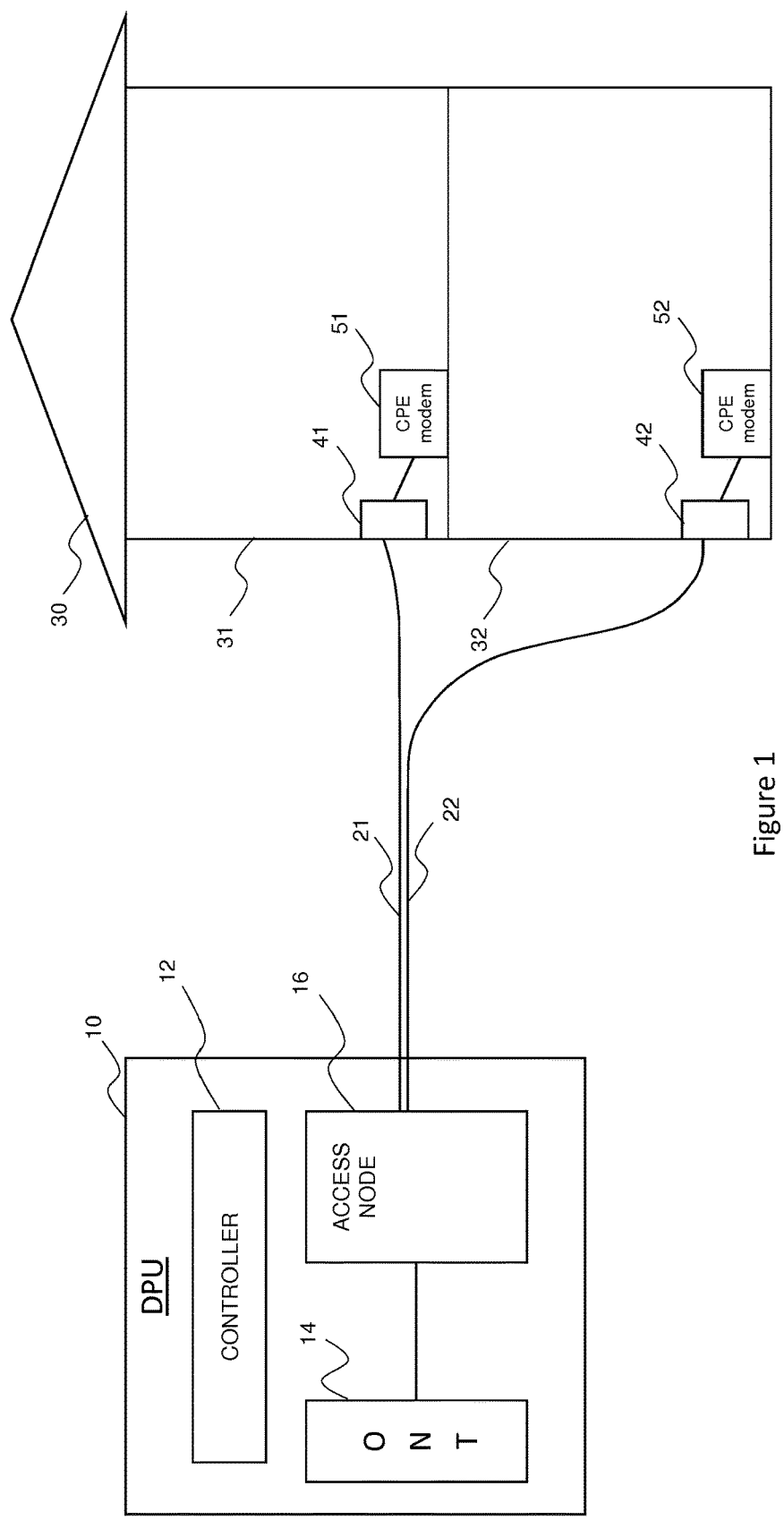
FIG. 1 is a schematic illustration of an example broadband connection deployment showing a Distribution Point Unit (DPU) and two customer premises having associated Customer Premises Equipment (CPE) modems connected to the DPU via respective Twisted Metallic Pair (TMP) connections.

FIG. 1 illustrates in overview an example broadband deployment in which embodiments of the present disclosure could be employed. As shown in FIG. 1, the example deployment comprises a Distribution Point Unit (DPU) 10 which is connected to two user premises 31,32 (which in this example are flats within a single house 30) via respective Twisted Metallic Pair (TMP) connections 21, 22, which connect between an Access Node (AN) 16 (e.g. a Digital Subscriber Line Access Multiplexor (DSLAM)) within the DPU 10 and respective Customer Premises Equipment (CPE) modems 51, 52 via respective network termination points 41, 42 within the respective customer premises 31, 32. The DPU 10 additionally includes an Optical Network Termination (ONT) device 14 which provides a backhaul connection from the DPU 10 to a local exchange building via an optical fiber connection such as a Passive Optic-fiber Network (PON) and a controller 12 which coordinates communications between the AN 16 and the ONT 14 and which may perform some management functions such as communicating with a remote Persistent Management Agent (PMA).

As will be apparent to a person skilled in the art, the illustrated deployment involving an optical fiber backhaul connection from a distribution point and a twisted metallic pair connection from the distribution point to the customers' premises is exactly the sort of deployment for which the G.FAST standard is intended to be applicable. In such a situation, the TMP connections may be as short as a few hundred meters or less, for example possibly a few tens of meters only and because of this it is possible to use very high frequency signals (e.g. up to a few hundred Megahertz) to communicate over the short TMP's because the attenuation of high frequency signals is insufficient to prevent them from carrying useful information because of the shortness of the lines. However, at such high frequencies cross-talk becomes a significant issue. This is clearly especially going to be the case where the cross-talking lines travel alongside each other for part of their extent (as in the situation illustrated in FIG. 1); however, cross-talk is still an issue at high frequencies (e.g. over 80 MHz) even where the lines only lie close to one another for a very small portion of their total extent (e.g. just when exiting the DPU 10). G.FAST currently proposes simply using vectoring techniques at all frequencies where there are cross-talking lines in order to mitigate against the cross-talk effects. However, embodiments of the present disclosure use an alternative technique to mitigate against the crosstalk effects.

First Embodiment

Figure 2:
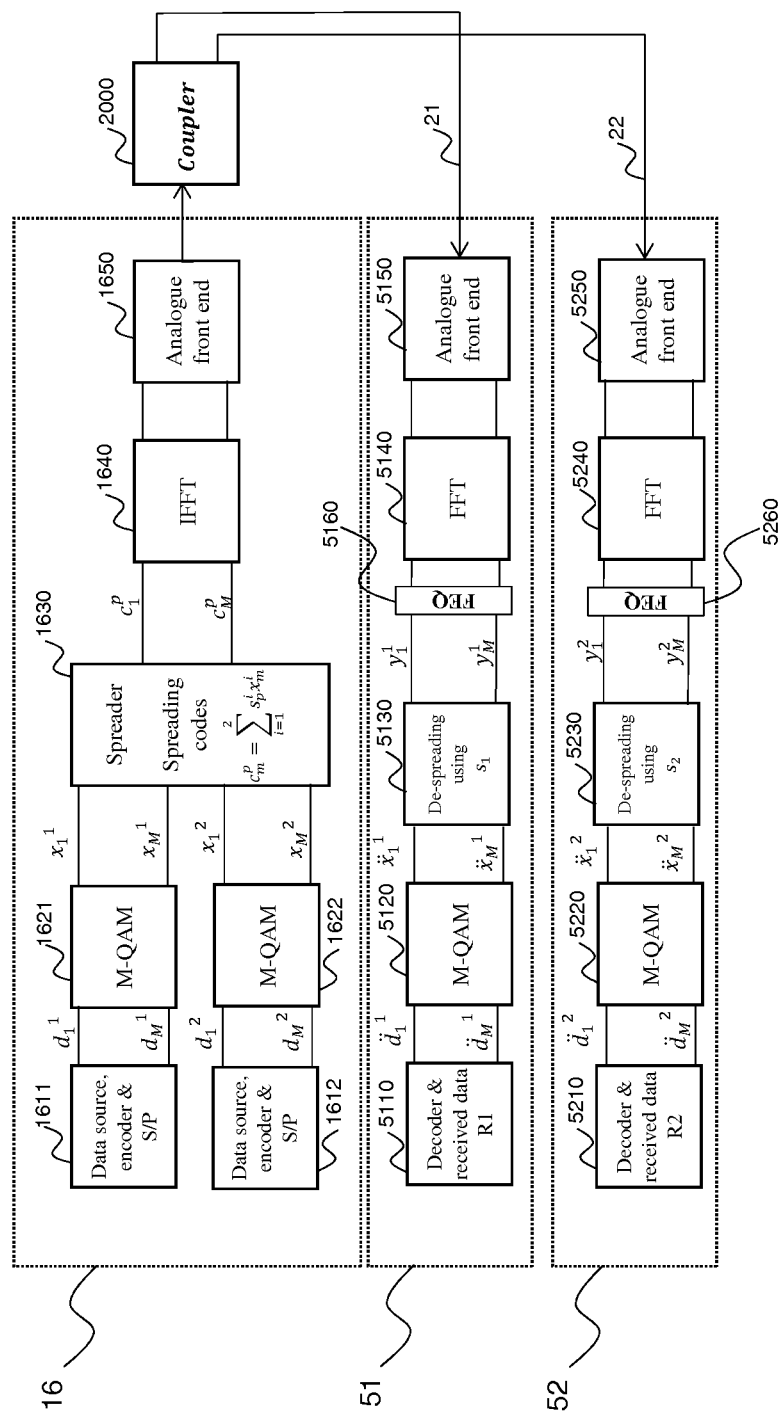
FIG. 2 is a schematic block diagram illustrating the principal components in a modem to modem connection operating in accordance with a first embodiment of the present disclosure.

Referring now to FIG. 2, there is shown a schematic illustration of the principal components within the AN 16 and CPE modems 51, 52 allowing the indirect channels associated with cross-talking effects to be utilized rather than simply being mitigated against by employing vectoring techniques according to a first simple embodiment chosen to illustrate the basic principles of the approach.

As shown, the AN 16 according to the embodiment illustrated in FIG. 2 comprises first and second Data Source, Data Encoder and Serial to Parallel converter (DSDESP)

modules 1611 and 1612. These are essentially conventional functions within a DSL modem and will not be further described here except to point out that its output is a set of data values $d_1$-$d_M$ each of which can be mapped to both a set of one or more bits and to a point within a modulation signal constellation associated with a respective tone on which the data value is to be transmitted. For example if a tone $t_1$ is determined to be able to carry 3 bits of data a corresponding data value will be set to one of $2^3$=8 different values (e.g. to a decimal number between 0 and 7) each of which corresponds to a different constellation point within an associated signal constellation having 8 different constellation points. The data values for a single symbol can be thought of as forming a vector of data values (one for each data-carrying tone) and together carry the user data to be transmitted to the end user associated with a respective end user modem 51, 52 together with any overhead data (e.g. Forward Error Correction data etc.).

Note also that because the present embodiment employs a Code Division Multiple Access (CDMA), each DSDESP module 1611,1612 generates a data value for each tone such that both modules 1611,1612 generate a data value for transmission over tone 1 (e.g. $d_1^1$ and $d_1^2$). These data values need not necessarily relate to the same number of bits as will be explained in greater detail below. For example, it is possible that modem 51 could determine that tone 1 is able to support 3 bits per symbol, whilst modem 52 could determine that tone 1 is only able to support 2 bits per symbol. In such a case, DSDESP 1611 could generate a 3 bit data value (e.g. a number between 0 and 7), $d_1^1$, whilst DSDESP 1612 could generate a 2 bit data value (e.g. a number between 0 and 3).

The data values leaving each DSDESP module 1611, 1612 are then passed (in an appropriate order) to respective Multiple bit level Quadrature Amplitude Modulation (M-QAM) modulators 1621, 1622 which convert each input data value to a respective complex number $x_1^1$ to $x_M^1$ and $x_1^2$ to $x_M^2$ each of which represents a complex point within a complex number constellation diagram. For example a data value $d_1^1$=7 (=111) might be mapped by the M-QAM modulator 1621 to the complex number 1−i for tone 1 where tone 1 has been determined (by modem 51) to be able to carry 3 bits of data each.

Each of these complex numbers $x_1^1$ to $x_M^1$ and $x_1^2$ to $x_M^2$ is then entered into a Spreader module 1630 (which in the present embodiment is a single common spreader module 1630) which performs a conventional CDMA spreading operation given by the following equation:

$$c_m^p = \sum_{i=1}^{k} s_p^i x_m^i$$

in order to generate a set of "chips" $c_m^p$, such that k complex numbers $x_m^i$ (for all i from i=1 to i=k) are converted to P chips $c_m^p$ (for all p from p=1 to p=P) where P is the length of the spreading code being used and k is the number of different data streams being multiplexed using the CDMA technique employed. This combining and spreading is performed for all M sets of K lots of $x_m^i$ (for all m from m=1 to m=M and all i from i=1 to i=k) to generate a corresponding M sets of P combined and spreaded chips $c_m^p$ (for all m from m=1 to m=M and for all p from p=1 to p=P). In the present embodiment, there are 2 such data streams (one for each end user modem 51, 52) such that k=2 and the spreading codes used are of length 2 such that P=2 (therefore M sets of pairs of complex numbers $x_m^1$ and $x_m^{i2}$ are converted into M sets of pairs of chips $c_m^1$ and $c_m^2$). Furthermore, in the present embodiment, the M sets of pairs of chips $c_m^1$ and $c_m^2$ are sent as 2 frames each containing M chips such that the original complex numbers are spread out over time, with the M chips being transmitted over a corresponding M tones in a conventional Discrete Multi-Tone (DMT) manner.

It will be appreciated that the effect of the combining and spreading is to both combine data intended for different end user modems together and to then spread it out again such that it can later be recovered by performing a de-spreading action. In this way virtual data channels are generated whereby data destined for the first modem 51 is transmitted from the first Data source, encoder and S/P module 1611 to the first modem 51 over a first virtual data channel and data destined for the second modem 52 is transmitted from the second Data source, encoder and S/P module 1612 to the second modem 52 over a second virtual data channel, even though in fact all of the same data is actually being transmitted over both TMPs 21,22 to both modems 51,52. The well-known CDMA principle by which this is achieved can be easily demonstrated with a simple numerical example (ignoring the effects of noise imparted to the transmitted signal during transmission over the channel for the time being) thus:

Consider in the present embodiment that the following spreading codes are used {1,1} and {1,−1}; in other words, $s_1^1$=1, $s_2^1$=1, $s_1^2$=1, $s_2^2$=−1; also consider that for a single tone, tone 1, we have a complex value 1+i to be transmitted to modem 51 ($x_1^1$=1+i) and a complex value −i to be transmitted to modem 52 ($x_1^2$=−i), after combining and spreading these are converted to two chips $c_1^1$=1+i+(−i)=1 and $c_1^2$=1+i+−(−i)=1+2i. These two chips are then transmitted (via the IFFT, Analogue front end channel, etc. discussed briefly below) in two separate frames and once they have both been received a de-spreading operation is performed within the modems 51, 52, with modem 51 using the spreading code {1,1} and modem 52 using the spreading code {1, −1} to recover the data using $\ddot{x}_1^1 = \Sigma_{p=1}^P s_m^p c_m^p$ with m=i=1 (the first tone for the first receiver – modem 51) such that $\ddot{x}_1^1$=1×1+1×(1+2i)=2+2i (or 1+i=$x_1^1$ after appropriate normalization) in modem 51, whilst, with m=1, i=2 (the first tone for the second receiver, modem 52) $\ddot{x}_1^2$=1×1+−1×(1+2i)=−2i (or −i=$x_1^2$ after appropriate normalization) in modem 52.

Once the chips have been generated in the above described manner, the remaining processing is conventional and not relevant to the present disclosure. Thus the appropriately generated chips are passed from the spreader module 1630 to an Inverse Fast Fourier Transform (IFFT) module 1640 for converting the multiple chips for a single frame into a combined quadrature time domain signal in the normal manner in Orthogonal Frequency Division Multiplexing (OFDM)/DMT systems. Then the time domain signals are processed by a suitable Analogue Front End (AFE) module 1650 again in any suitable such manner including any normal conventional manner. It is just worth noting in passing that in this embodiment just a single AFE module 1650 is used, but of course it would be equally possible to use two distinct AFE modules, one for each TMP 21,22; note that in embodiments where the common signal to be sent over multiple TMP connections is processed by a single common AFE (as in the present embodiment) an advantage arises in that the resulting signals transmitted onto the separate TMP connections will tend to be more similar than if they had been pre-processed by separate AFE modules (due to unavoidable small differences in the analogue components making up the AFE modules). In any event, in the present embodiment, after processing by the AFE module 1650, the resulting analogue signal is commonly transmitted onto both TMP connections 21,22 via a coupler arrangement 2000 which simply couples both TMP connections 21,22 to the common AFE module 1650.

During transmission over the TMP connections 21,22, the signals will be modified in the normal way according to the channel response of the channel and due to external noise impinging onto the connections. In particular there will be cross-talking (and most particularly far-end cross-talking) between the two direct channels (the direct channels being one from the transmitter 16 to the modem 51 via the TMP 21 and one from the transmitter 16 to the modem 52 via the TMP 22) resulting in signals being received at the modems 51 and 52 from indirect channels (e.g. signals transmitted onto TMP 21 but received at modem 52 and signals transmitted onto TMP 22 but received at modem 51). However, since the same common signal is transmitted onto both TMP connections, the net effect at each receiver/modem 51,52 is that of a single combined (direct and indirect) channel and it can be estimated and accounted for by the receiver/modem 51,52 in the normal way as though there is no cross-talking interference. Indeed, in general, the indirectly received component of the (combined directly and indirectly) received signal may increase the SNR of the received signal for a given modem 51,52 compared to a case where there was no indirectly received component of the signal (i.e. where no signal was transmitted onto the direct channel 22,21 of the other modem 52,51) and only a single direct signal is transmitted onto the directly connected TMP 21,22.

After passing over the TMP connections 21,22, the signal is received (by both modems 51,52) at an Analogue Front End (AFE) module 5150,5250 which performs the usual analogue front end processing. The thus processed signals are then passed to a Fast Fourier Transform (FFT) module 5140,5240 which performs the usual conversion of the received signal from the time domain to the frequency domain. The signals leaving the FFT module 5140,5240 are then passed in the present embodiment to a Frequency domain EQualizer (FEQ) module 5160,5260. The operation of such frequency domain equalizer modules is well-known in the art and will not therefore be further described herein. It should be noted however, that any type of equalization could be performed here, such as using a simple time-domain linear equalizer, a decision feedback equalizer, etc. For further information on equalization in OFDM systems, the reader is referred to: "Zero-Forcing Frequency-Domain Equalization for Generalized DMT Transceivers with Insufficient Guard Interval" by Tanja Karp, Steffen Trautmann, Norbert J. Fliege, *EURASIP Journal on Applied Signal Processing* 2004:10, 1446-1459.

Once the received signal has passed through the AFE, FFT and FEQ modules, the resulting signal, $y_1^1$ to $y_M^1$ and $y_1^2$ to $y_M^2$ should be similar to the chips $c_1^p$-$c_M^p$ presented to the IFFT module in the AN 16, except that there will be some degree of error resulting from imperfect equalization of the channel and the effect of external noise impinging onto the lines during transmission of the signals between the AN and the modems 51, 52. This error will in general differ from one receiving modem to the next. This can be expressed mathematically as $y_m^1 = c_m^p + e_m^1$ and $y_m^2 = c_m^p + e_m^2$ where $e_m^1$ is the difference between the value, generated by the combined processing of the AFE 5150, the FFT 5140 and the FEQ 5160 of the signal received at modem 51 and the chip, $c_1^p$, and is not necessarily equal to the corresponding error, $e_m^2$, of the second modem 52. These received values $y_1^1$ to $y_M^1$ for modem 51 and $y_1^2$ to $y_M^2$ for modem 52 are then passed to their respective de-spreading modules 5130 and 5230 where a de-spreading operation is performed. In the de-spreading operation each modem uses its own spreading code in order to recover the data destined for itself. In the present embodiment, the transmitted chips are spread in time such that it is necessary to perform the dispreading using a number of received signals received in different frames. Thus in the present embodiment, each de-spreading module 5130,5230 buffers the received values $y_1^1$ to $y_M^1$ and $y_1^2$ to $y_M^2$ until sufficient have been received to enable the de-spreading operation described mathematically by:

$$\ddot{x}_m^i = \sum_{p=1}^{P} s_m^p y_m^{p,i}$$

where in $y_m^{p,i}$ the i superscript indicates which receiving modem is performing the de-spreading operation (since different modems use different spreading codes) and the p superscript indicates which chip (within a sequence of chips required together to reconstruct a desired complex value for detection by an M-QAM demodulator module 5120,5220) the value relates to (wherein different chips have, in the present embodiment, been transmitted at different times—i.e. within different frames). In the present embodiment, each complex value x is spread into two chips using a spreading code of length 2 and these are transmitted in adjacent frames such that after receiving a pair of frames the two received and processed values $y_m^{1,i}$ and $y_m^{2,i}$ for each tone, m, are multiplied by their respective spreading code values, namely $s_m^1$ and $s_m^2$ respectively and then summed together. The resulting de-spreaded signals $\ddot{x}_1^1$ to $\ddot{x}_M^1$ and $\ddot{x}_1^2$ to $\ddot{x}_M^2$ are then passed to each respective M-QAM demodulator module 5120,5220 where a corresponding constellation point is selected for each value $\ddot{x}_m^i$ in dependence on its value (e.g. by selecting the constellation point closest to the point represented by the value $\ddot{x}_m^i$ unless trellis coding is being used, etc.). The resulting data values $\ddot{d}_1^1$ to $\ddot{d}_M^1$ and $\ddot{d}_1^2$ to $\ddot{d}_M^2$ should mostly (apart from some small number of incorrectly detected values resulting from errors) correspond to the data values, $d_1^1$ to $d_M^1$ and $d_1^2$ to $d_M^2$ originally entered to the corresponding M-QAM 1621,1622 within the AN/transmitter 16. These values are then entered into a respective decoder (and received data processing) module 5110 which reassembles the detected data and performs any necessary forward error correction etc. and then presents the recovered user data to whichever service it is addressed to in the normal manner, thus completing the successful transmission of this data.

Variations of the First Embodiment

In the above described embodiment there are only two TMP connections between the AN 16 and a corresponding pair of end-user modems. However, it will be appreciated that the scheme can be applied to any number of TMP's and corresponding modems by simply extending the number of sets of data source, encoder and S/P 1611, 1621 and M-QAM modulator 1621, 1622 modules, which feed into the spreader module 1630, accordingly; in addition, it would of course be necessary to increase the number of orthogonal spreading codes employed accordingly to enable the different sets of data to be merged together in the spreading operation, as will be apparent to persons skilled in the art, as well as increasing the number of sets of frames required to be buffered before performing de-spreading at the modems, etc.

It will be apparent to skilled readers that the CCM mode described above can be considered a type of Multi-Carrier Code Division Multiple Access (MC-CDMA) technique. As such it will be apparent that having generated the "chips" it is possible to spread them either in time (as in the first embodiment described above) or in frequency. In order to spread the chips in frequency, instead of generating one chip for each tone in each frame, one generates fewer sets of data values $d_1^1$ to $d_M^1$ for each user/modem relative to the number of tones available. For example, in a two user case using a spreading code of 2 (as before) (and assuming that all tones can carry the same number of bits per tone, unlike in the first embodiment) one could generate half as many data values for each user per frame as there are tones available for carrying the data values. Once chips have been formed (two for each data value), there will then be exactly the same number of chips to carry as tones on which to carry them, and each chip is allocated to one tone. Since all chips are carried in one frame, there is no need in such an arrangement for received chips to be buffered prior to de-spreading and so latency is reduced in this arrangement.

On the other hand, one needs to ensure that so far as possible tones which are able to carry the same number of bits (from the perspective of all receiving modems (even though the actual number of bits which both tones can carry need not be the same for different modems—i.e. if modem 1 determines that tones 1 and 11 can both carry 3 bits each and modem 2 determines that tones 1 and 11 can both carry 2 bits each they would make a good candidate for carrying two chips associated with the same data vectors).

If it is necessary to use two tones which (for at least one receiving modem) the estimated number of bits which they can carry is not equal, then some decision must be made as to what level of modulation to perform. However, it may be that in some circumstances, e.g. where even though a given first tone could only reliably carry say 2 bits under a conventional DMT scheme, that the gain achieved using a CDMA approach may enable say 3 bits to be reliably carried over the combination of the first given tone when partnered with a second given tone (especially where that second given tone would be able to reliably carry 3 or more bits of data on its own in a conventional DMT approach).

Second Embodiment

Figure 3:
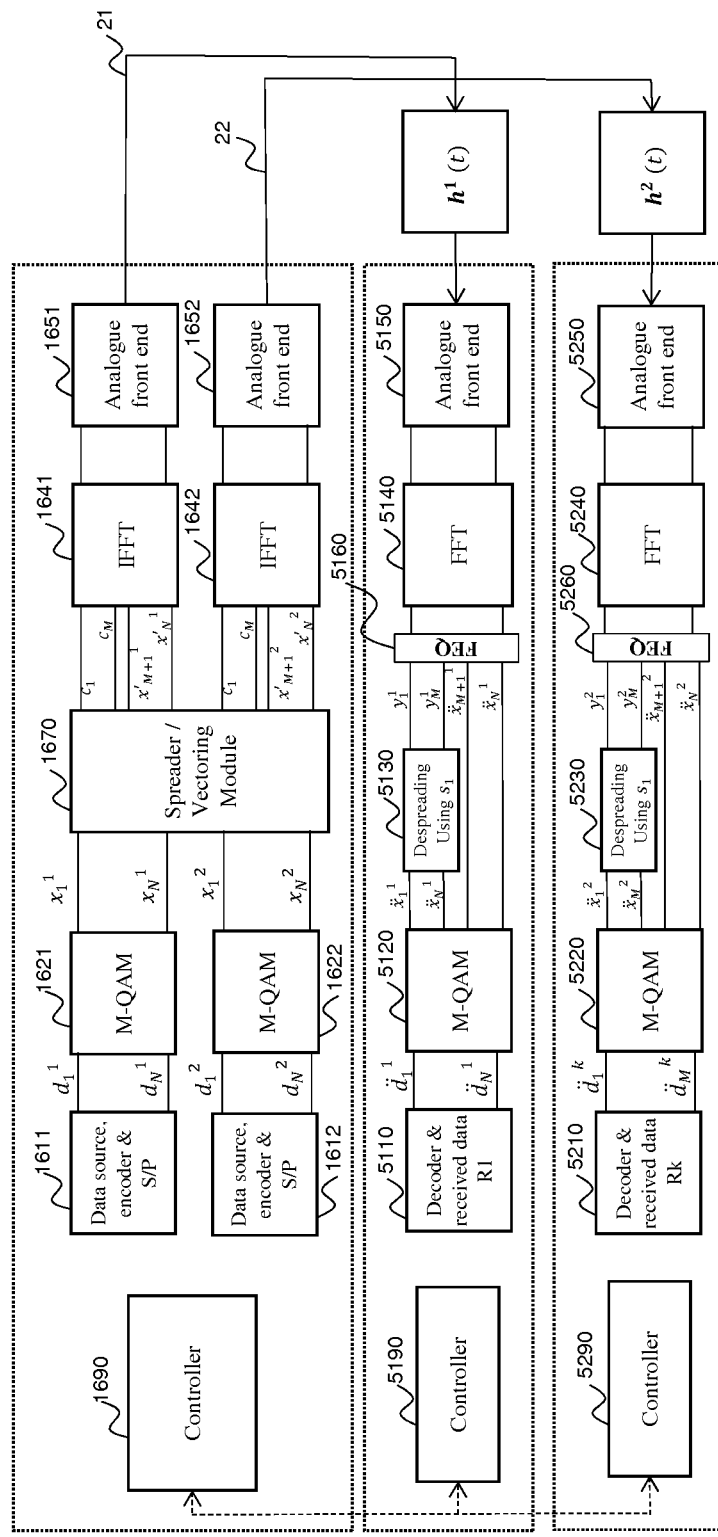
FIG. 3 is a schematic block diagram similar to FIG. 2 illustrating the principal components in a modem to modem connection operating in accordance with a second embodiment of the present disclosure.

It will be appreciated that the above-described embodiment with reference to FIG. 2 above demonstrates a combined direct and indirect channel transmission method in a fairly crude form in order to illustrate the basic principle. Turning now to FIG. 3, there is described a more sophisticated embodiment in which more than one mode of transmission is used in order to enable a greater spectral efficiency than can be achieved with the embodiment illustrated in FIG. 1 and described above.

Thus in FIG. 3, in which like reference numerals have been used for like components, it can be seen that the spreader module 1630 of FIG. 2 has been replaced with a Spreader/Vectoring module 1670 which performs conventional vectoring in respect of some tones and spreading in respect of the remaining tones in a manner discussed in greater detail below. Additional changes compared to the embodiment of FIG. 2 can be seen to include that in this embodiment a pair of separate IFFT modules 1641 and 1642 replace the common IFFT module 1640 of the embodiment illustrated in FIG. 2 and similarly separate analogue front end (AFE) modules 1651 and 1652 replace the common AFE module 1650 of FIG. 2. Additionally no coupler module 1660 is required in the embodiment of FIG. 3 as each AFE 1651, 1652 merely connects directly to its associated TMP 21, 22. Indicated instead in FIG. 3 is a box indicating that the effect of the TMPs 21,22 is to give rise to a (combined direct and indirect) channel response $h^i(t)=(h_1^1(t)\ h_2^1(t))$ in respect of TMP 21 and $h^2(t)=(h_1^2(t)\ h_2^2(t))$ in respect of TMP 22—which mathematically can be considered as a single combined matrix channel response $$h(t) = \begin{pmatrix} h_1^1(t) & h_2^1(t) \\ h_1^2(t) & h_2^2(t) \end{pmatrix}.$$

Also shown explicitly in FIG. 3 are various controllers 1690, 5190 and 5290 located within the AN 16, first modem 51 and second modem 52 respectively. As shown in FIG. 3 with a dashed connecting line, these controllers are able to communicate with one another (e.g. via a conventional embedded operations channel (EOC) as is well known in DSL technology). The primary function of the illustrated controllers in the present embodiment is to enable the AN 16 on the one hand and the modems 51,52 on the other hand to coordinate with one another in determining and setting a CCM cut-off frequency (discussed below) and in controlling the sending of training signals to enable correct channel estimation to be performed as will be described in greater detail below with reference to FIG. 4.

From FIG. 3 it can be seen that 4 sets of values are output from the spreader/vectoring module, although in fact two of these sets are identical. Thus the top most set of values output are chip values from $c_1$ to $c_m$, then a set of pre-distorted complex numbers $x'_{M+1}{}^1$ to $x'_N{}^1$, then a second copy of the chips, $c_1$ to $c_m$, are output and finally a second, different set of pre-distorted complex numbers $x'_{M+1}{}^2$ to $x'_N{}^2$ are output. Note also that the first two sets of output values ($c_1$ to $c_m$ and $x'_{M+1}{}^1$ to $x'_N{}^1$) are passed to the first IFFT module 1641 whilst the second two sets of values ($c_1$ to $c_m$ and $x'_{M+1}{}^2$ to $x'_N{}^2$) are passed to the second IFFT module 1642.

The chips, $c_1$ to $c_m$, are generated in the same manner as in the first embodiment as described above with reference to FIG. 2, whilst the complex values $x'_{M+1}{}^1$ to $x'_N{}^1$ are generated using conventional vectoring techniques by pre-distorting the values, $x_{M+1}{}^1$ to $x_N{}^1$ output by the M-QAM module 1621 to take into account the effect of the signals $x_{M+1}{}^2$ to $x_N{}^2$ to be transmitted (after their own pre-distortion to $x'_{M+1}{}^2$ to $x'_N{}^2$) onto TMP 22 based on estimated knowledge of the degree of cross-talk coupling from TMP 22 onto TMP 21 in the normal manner in which this is done according to well-known vectoring techniques. The spreader/vectoring module 1670 pre-distorts the values $x_{M+1}{}^2$ to $x_N{}^2$ to form the output values $x'_{M+1}{}^2$ to $X'_N{}^2$ in a similar manner.

At each of the receivers, the received signals are processed in the normal manner by the AFE, FFT and FEQ modules to generate in the first modem 51 values $y_1^1$ to $y_M^1$ on tones 1 to M respectively and $\ddot{x}_{M+1}{}^1$ to $\ddot{x}_N{}^1$ on tones M+1 to N. Only the values $y_1^1$ to $y_M^1$ are passed to the dispreading module 5130 in this embodiment whilst values $\ddot{x}_{M+1}{}^1$ to $\ddot{x}_N{}^1$ are passed directly to the M-QAM demodulator module 5130. Thus it can be seen that in essence two distinct "channels" are being used in this embodiment with tones 1 to M being used in a CCM mode whilst tones M+1 to N are being used in a conventional vectored DSL mode (note these could also use a mode according to the currently proposed G.FAST draft standard employing vectored DMT in a Time Division Multiplex manner, etc.). One point to note is that if (as in the present embodiment) the chips are spread over time such that two (or more) frames need to be received and buffered before all of the chips required to perform the de-spreading action in order to recover the transmitted user data are available, as per the first embodiment, then there is a need for the AN 16 to schedule the data for the CCM mode to be transmitted at half (or less) the rate at which data to be transmitted over the vectored DMT mode channel is scheduled for transmission. In the present embodiment, this is handled by the data source, encoder and S/P modules 1611, 1612.

A further point to note is that the process of performing channel estimation which is required for both modes of operation (vectored DMT and CCM mode) needs to be done slightly differently for the two modes. Therefore, in the present embodiment, the controllers 1690, 5190 and 5290 co-operate in the manner described below with reference to FIG. 4 in order to determine a cut-off frequency which will determine which tones are employed in a CCM mode by specifying a value M such that tones 1 to M are used in the CCM mode and tones M+1 to N are used in a vectored DMT mode (or similar) where 1 is the highest frequency tone available to the system and N is the lowest frequency tone available to the system. Additionally the controllers control the operation of the modems to perform the necessary channel estimations required to operate the tones 1 to M in the CCM mode.

Figure 4:
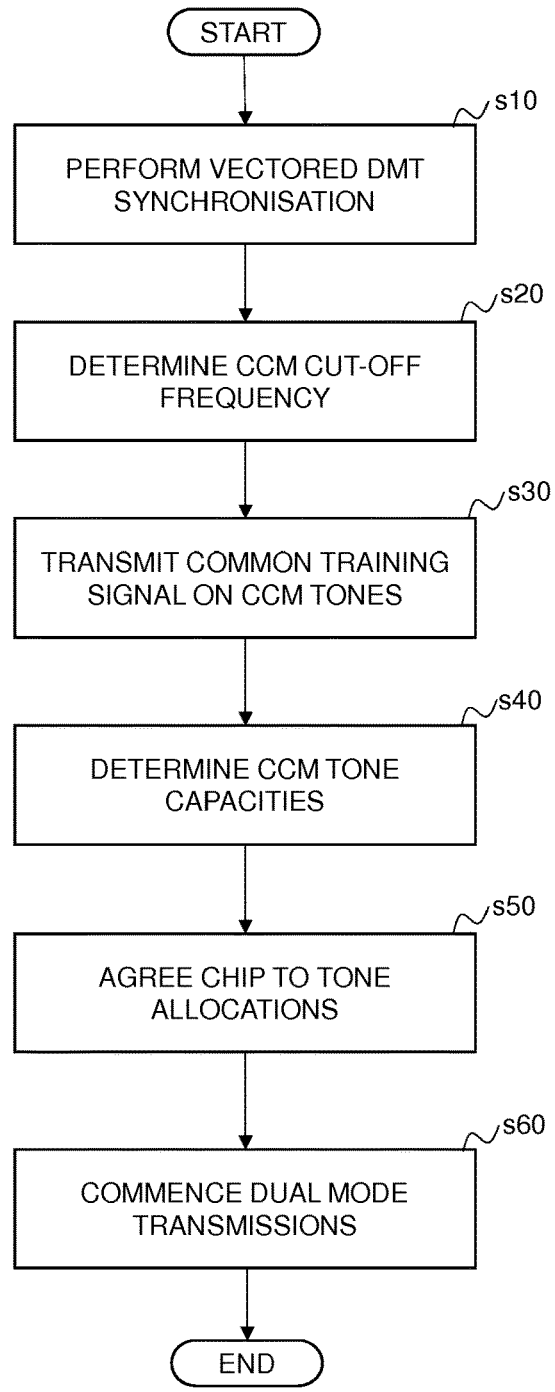
FIG. 4 is a flow chart illustrating the control method performed by the controller units in FIG. 3.

Before turning to FIG. 4, it is also worth mentioning that although the figures do not illustrate the components required for performing upstream transmissions (from the modems 51, 52 to the AN 16) it goes without saying that these components are included but have simply not been illustrated because they are irrelevant to the present embodiment. It should be noted though that upstream transmissions could be handled either by means of a frequency division multiplexing as per DMT techniques according to VDSL standards, or using a TDM approach as per current draft versions of the evolving G.FAST standards.

Turning now to FIG. 4, the method performed by the controllers to co-ordinate the transmissions between the AN and the modems 21,22 so as to use the CCM mode for a portion of the available tones only is now described. The method commences at s10 in which the modems perform conventional synchronization except that SHOWTIME mode is not entered immediately upon completion of the conventional synchronization although the EOC channel is established (e.g. using only low frequency tones). The normal synchronization process involves the performance of channel estimations and an assessment of the indirect couplings etc. in order to enable suitable vectoring parameters to be estimated, etc. Upon completion of this step the EOC channel is established enabling the AN controller 1690 to communicate with the modem controllers 5190,5290. The method then proceeds to s20 in which the AN controller 1690 determines an appropriate CCM cut-off frequency. In the present embodiment, this is done by selecting as the CCM cut-off tone EITHER the lowest tone which has been estimated as being capable of carrying no more than 1 bit (by both modems 51,52) and for whom the average (mean) estimated number of bits per tone for all tones below it is greater than two bits per tone and whose average (mean) estimated number of bits per tone for the remaining tones (itself and all tones having a higher frequency than itself) is less than two bits per tone OR the tone which marks the top 20$^{th}$ percentile of all of the available tones (i.e. where M=N/5), such that the CCM tones range from tone 1 to tone M=N/5, WHICHEVER of these two options has the highest number (i.e. having the lower frequency, so as to maximize the number of tones allocated to the CCM mode since tones are numbered from 1 (highest frequency) to N (lowest frequency)).

Having selected the CCM cut-off frequency/cut-off tone, the method proceeds to S30 in which a common training signal is generated and transmitted in the CCM mode over the tones allocated for use in the CCM mode. Each modem 51,52 again measures the channel at each of the respective tones in the CCM portion of tones. The method then proceeds to s40 in which each modem estimates, based on the channel measurements taken in the preceding step, the number of bits which each such tone can support in CCM mode per Frame (or per set of frames since there should be some coding gain resulting from the spreading and de-spreading action).

The method then proceeds to s50 in which chip to tone allocations are determined by the AN controller 1690 based on the estimated tone capacities. In the present embodiment this is trivial and can simply be performed on any arbitrary or convenient basis (e.g. numbering each generated chip for transmission in a single frame and allocating it to a similarly numbered tone) but in other embodiments this step could be less trivial (e.g. where an element of spreading in frequency is employed such that some chips encoding the same data are sent in the same frame as discussed above in relation to a variation of the first embodiment).

Finally, at s60 the system enters SHOWTIME with some data being transmitted over the portion of tones allocated to vectored DMT (which could include transmitting according to the currently proposed methods for transmitting downstream data according to G.FAST proposals/drafts) and the rest being transmitted in CCM.

Figure 5:
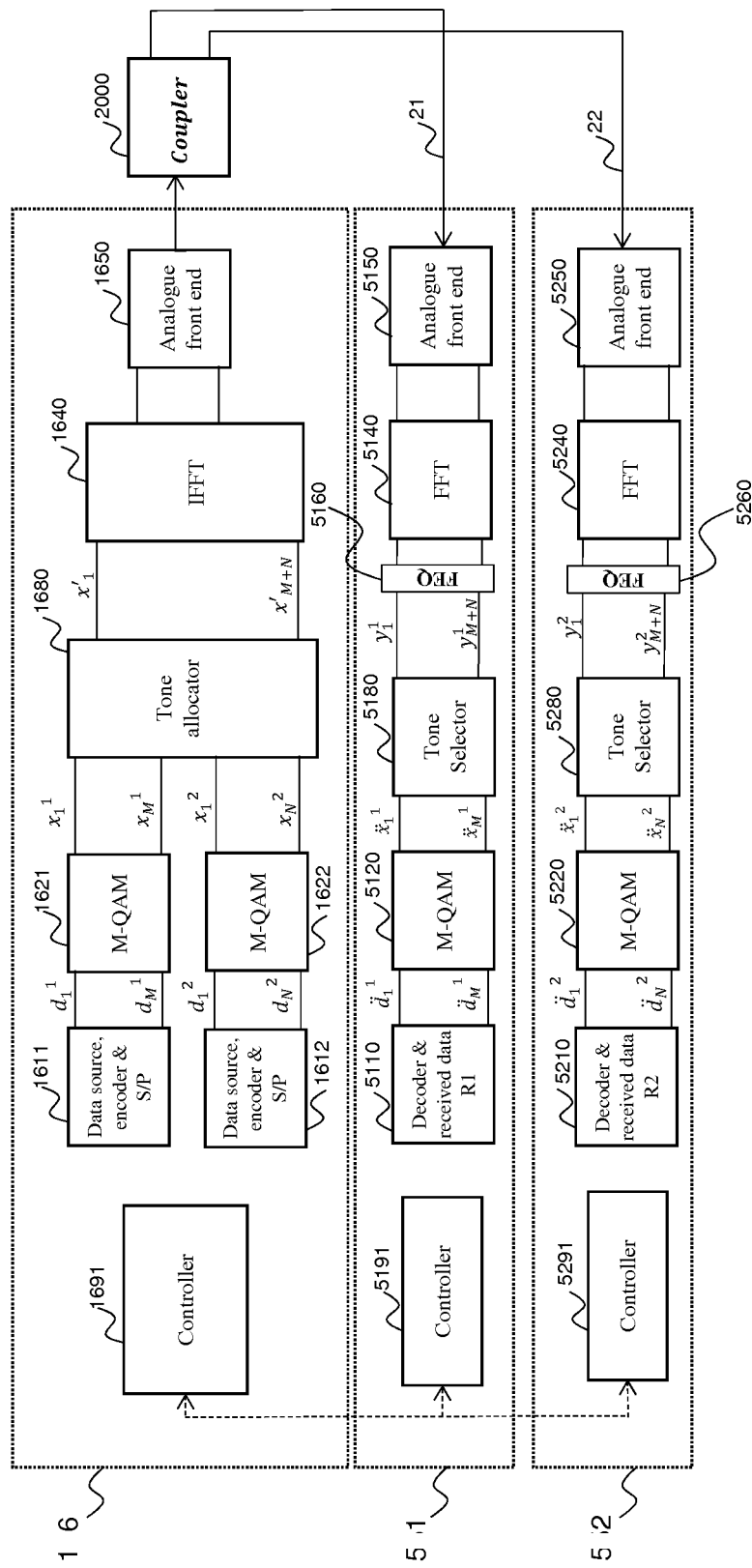
FIG. 5 is a schematic block diagram similar to FIGS. 2 and 3 illustrating the principal components in a modem to modem connection operating in accordance with a third embodiment of the present disclosure.

Turning now to FIG. 5, there is shown a third embodiment of a CCM transmission system where again like reference numerals have been used for like components based on FIG. 2. Similar to FIG. 2, this embodiment is intended to illustrate in principle an alternative CCM scheme in which FDMA is used instead of CDMA and therefore it excludes details relating to how only a portion of the tones might be used in CCM with the rest being used in a vectored DMT mode (as per the second embodiment) as well as excluding details relating to upstream transmissions, etc. although, as with the other embodiments, it should of course be realized that actual embodiments would of course include such additional aspects and they have been omitted from FIG. 5 and the present discussion thereof merely for the sakes of clarity and brevity. FIG. 5 does though include controllers 1691, 5191 and 5291 which play a similar role to that of the controllers in FIG. 3 but have slightly different functionality owing to the FDMA nature of this embodiment. There functionality is discussed in greater detail below with reference to FIG. 6.

From FIG. 5 it can be seen that, in place of the spreader 1630 and de-spreader 5130,5230 modules, this third embodiment has, in the AN 1611, a tone allocator 1680 and, in the modems 51,52, tone selector modules 5180,5280. Also in FIG. 3 the second Data Source, Data Encoder and S/P (DSDESP) module 1612 is illustrated as generating data values $d_1^2$ to $d_N^2$ rather than to $d_M^2$ as was the case in FIG. 2. The reason for this is just to emphasize that it is not necessary for the same number of data values to be generated by each of the two DSDESP modules 1611,1612 in the present embodiment for reasons which will become apparent. Correspondingly, the output from the second M-QAM modulator 1622 is a set of complex numbers $x_1^2$ to $x_N^2$ corresponding to the data values $d_1^2$ to $d_N^2$ passed thereto.

In this embodiment, the M+N complex numbers generated by the first and second modulators 1621,1622 are all passed to the tone allocator 1680 which allocates each of these values to a corresponding tone and then forwards them on as (re-ordered but otherwise unchanged) complex values $x'_1$ to $x'_{M+N}$ to the IFFT which accepts all M+N values. In other words there are M+N tones available and the complex values are each allocated to a single respective tone. In particular, some of the tones are thereby allocated to data from the first DSDESP module 1611 which data are destined for the first modem 51 whilst the remaining tones are allocated to data from the second DSDESP module 1612 which data are destined for the second modem 52. The complex numbers are then processed in the normal way by the IFFT and AFE modules 1640, 1650 and the resulting signals are coupled via coupler 2000 onto both TMPs 21,22 as in the first embodiment. At each modem 51,52 the signals are received and processed as in the first embodiment to generate (after the normal processing by the respective AFE, FFT and FEQ modules 5150,5250,5140,5240,5160,5260) to generate values $y_1^1$ to $y_{M+N}^1$ at the first modem 51 and values $y_1^2$ to $y_{M+N}^2$ at the second modem 52. As in the first embodiment, these values should be very similar but may differ slightly owing to differences in the channel between AN 16 and the first modem 51 and the channel between AN 16 and the second modem 52. At each modem 51, 52, these values $y_1^1$ to $y_{M+N}^1$ and $y_1^2$ to $y_{M+N}^2$ are then passed to a respective tone selector module 5180, 5280 which (under the control of its respective controller 5191, 5291) selects only the values coming from tones allocated to the modem of which it forms a part and forwards these on as values $\ddot{x}_1^1$ to $\ddot{x}_M^1$ (for the first modem 51), $\ddot{x}_1^2$ to $\ddot{x}_N^2$ (for the second modem 52) to its respective M-QAM demodulator 5120, 5220 for demodulation. By selecting the correct values corresponding to only the tones allocated to it, each modem recovers from the totality of the received data just the data destined for itself.

An important point to note is that (as mentioned earlier in this application) since the channels (as viewed from each respective modem) may differ slightly, it is possible that a particular tone may appear to be capable of supporting more bits from the perspective of one modem compared to another. In order to maximize the spectral efficiency of the transmission system as a whole it is advantageous to allocate such tones to the modem which can receive a greater number of bits from a particular tone than another modem. As well as maximizing the spectral efficiency, this also helps to reduce the risk of data intended for one modem being received and eavesdropped on by another modem. However, such risk is still present and with all of these CCM methods described in this specification, where there are security concerns of data intended for one modem being intercepted by another encryption techniques should be employed to reduce that risk.

Figure 6:
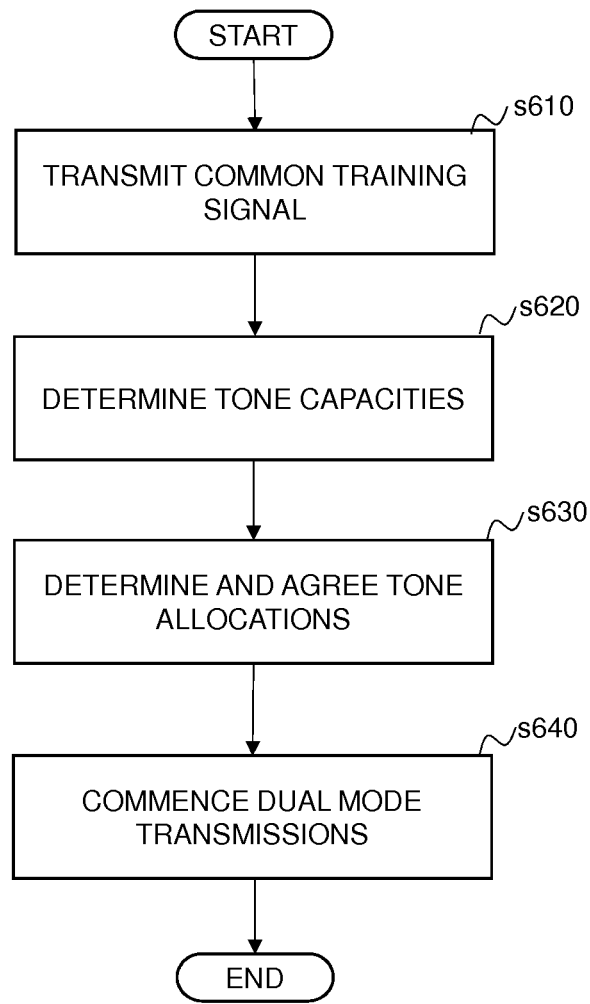
FIG. 6 is a flow chart illustrating the control method performed by the controller units in FIG. 5.

As will be appreciated by the reader by this stage, the main function of the controllers 1691, 5191 and 5291 is to both decide on a suitable allocation of the tones to modems and to agree this between themselves so that the transmitted data is correctly allocated to the expected tones and then at the receiving modems that the correct data is recovered again. In order to perform this functionality, the method illustrated in FIG. 6 is performed. Note that the method described below with reference to FIG. 6 assumes that there is a means of communicating between the controllers. This can be done in any convenient manner including by means of an arrangement such as described above with reference to FIGS. 3 and 4, or by any other suitable means.

Thus, with reference now to FIG. 6, upon commencement of the method at s10, the AN 16 transmits training signals over all of the tones and these are detected and measured by the modems 51,52. Based on these measurements at the modems, at s20 each modem determines the tone capacity (e.g. the number of bits which the modem considers can be carried per frame by a given tone) and communicates this to the AN controller 1691.

The method then proceeds to s30 in which the AN controller uses the assessment by each modem of the capacity of each tone to determine an intelligent allocation of tones to each modem 51, 52 in such a way as to attempt to maximize the spectral efficiency of the system by allocating tones to the modems for which those tones can support the greatest number of bits. An example algorithm for achieving this is set out in greater detail below. Having determined a suitable allocation in this way, the AN controller 1691 then informs each modem controller 5191, 5291 which tones have been allocated to it (or more accurately to its modem 51, 52).

The method then proceeds to s40 in which actual data is transmitted from the AN 16 to each of the modems in the FDMA CCM mode of operation. In one embodiment the channel may continually be measured and reported to the AN controller 1691 which may periodically determine that the allocation of tones should be changed and then co-ordinate the changing of the allocation with the modem controllers in order to continually optimize the transmission system despite changes in the noise environment.

Example Algorithm for Allocating Tones to Modems

Any algorithm which generates a reasonably efficient allocation of tones to modems based on the number of bits which the modems consider a tone can support can be used. Merely as an example of one such algorithm the following pseudocode is given below:

If we define the variable $BPF_r$ as the number of bits per Frame received by a receiver, r, and $BPT_t^r$ as the number of bits that tone, t, can support for receiver, r, and $\delta_{r,t}$ takes the value 1 if tone t is allocated to receiver, r, but takes the value 0 otherwise, then we specify that the algorithm seeks to maximize both min{BPF} and $\Sigma BPF_r$ (summed over all receivers) for all receivers, r (i.e. where 1≤r≤R, where R is the total number of receivers (or end user modems)).

set T=total number of tones;
set R=total no of receivers;
create integer array BPF[R] with all zero valued elements;
create 2 dimensional integer array BPT [R,T] with all zero valued elements;
create 2 dimensional binary array KDEL[T,R] with all zero elements;
create 1 dimensional Boolean array ALLOCATED[T] with all FALSE elements;
create temp integer variables rSEL and tSEL;
set BPT[r,t] for each r and each t from information provided to central controller from each receiver controller (as per s20 in FIG. 6);
Start Loop;
select all r for which BPF[r] is a minimum value (compared to all values of BPF[r] for all values of r);
for all selected r and for all not yet allocated tones, t, (where ALLOCATED[t]=FALSE)

set rSEL=r and tSEL=t for which BPT[r,t] is a maximum (if more than one select any one by any arbitrary process— e.g. the lowest value oft and/or the lowest value of r);

set KDEL[tSEL,rSEL]=1, ALLOCATED[t]=TRUE and BPF[r]=BPF[r]+BPT[rSEL,tSEL];

set BPT[r,tSEL]=0 for all r rSEL;

repeat loop until ALLOCATED[t]=TRUE for all t.

Briefly stated, the above algorithm iteratively identifies the receiver (or receivers) with the (currently) lowest bits per frame and identifies for it (or them) the (or one of the) tones which can support the highest number of bits for that receiver and allocates it to the respective receiver, and then updates the number of bits per frame associated with that receiver and re-iterates.

The invention claimed is:

1. A method of transmitting data from a transmitter device to a plurality of receiver devices, each of which is connected to the transmitter device via a respective wire connection, the method comprising:

transmitting a common signal onto all or both of the respective wire connections; and using a multiple access technique to enable respective virtual data channels to be generated for transmitting data from the transmitter device to each of the receiver devices via its own respective virtual data channel, wherein the common signal transmitted onto all or both of the respective wire connections is employed in a predetermined upper portion of an available frequency spectrum available for use in communicating over metallic pair connections, and in a lower portion of the available frequency spectrum vectored discrete multi-tone transmission is used.

2. A method according to claim 1 wherein the common signal is a discrete multi-tone signal in which the modulation level per tone may be varied.

3. A method according to claim 2 wherein the virtual data channels are formed by using a code division multiple access technique.

4. A method according to claim 2 wherein the virtual data channels are formed by using a frequency division multiple access technique.

5. A method according to claim 3 wherein different levels of modulation are used for data, destined for different receiver devices, transmitted within the common signal within a given tone in dependence upon differences in the received signal to noise ratio of signals received at the different receiver devices for the given tone.

6. A transmitter for transmitting data, to at least a first and a second receiver device via respective first and second wire connections which directly connect each respective receiver device to the transmitter device, using a discrete multi-tone communication method employed at frequencies at which there is significant indirect coupling between the wire connections, the transmitter device comprising:

a data combiner for combining a first set of data to be transmitted to the first receiver and a second set of data to be transmitted to the second receiver into a single common discrete multi-tone signal; and a line driver for driving both the first and second wire connections with the common signal, wherein the transmitter is operable to transmit the common discrete multi-tone signal onto all or both of the respective wire connections in a predetermined upper portion of an available frequency spectrum available for use in communicating over metallic pair connections, and is further operable to transmit different respective vectored signals over each respective wire connection in a lower portion of the available frequency spectrum.

7. A receiver device for receiving data transmitted to it over a wire connection from a transmitter according to claim 6, the receiver comprising a receiver for receiving the common discrete multi-tone signal, and a data extractor for extracting from the common signal a first set of data transmitted by the transmitter for reception at the receiver device.

8. A receiver according to claim 7 wherein the data extractor comprises a de-spreader module for performing a de-spreading operation on the received signal in accordance with a code division multiple access technique.

9. A receiver according to claim 7 wherein the data extractor comprises a tone selector for selecting a sub-set of values detected by the receiver and associated with different tones based on a predetermined allocation of tones to the receiver as specified by the transmitter.

* * * * *